US008000334B2

(12) United States Patent
Everson et al.

(10) Patent No.: US 8,000,334 B2
(45) Date of Patent: Aug. 16, 2011

(54) METHODS AND IMPROVEMENTS FOR JOINING WIRELESS MESH NETWORKS

(75) Inventors: John M. Everson, Leawood, KS (US);
Jason R. Delker, Olathe, KS (US);
Jeremy G. Titus, Spring Hill, KS (US);
James W. Norris, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 627 days.

(21) Appl. No.: 11/652,912

(22) Filed: Jan. 11, 2007

(65) Prior Publication Data
US 2008/0170549 A1 Jul. 17, 2008

(51) Int. Cl.
*H04W 4/00* (2009.01)
(52) U.S. Cl. .................. 370/401; 370/338; 370/403
(58) Field of Classification Search .............. 370/338, 370/331, 254, 401–403; 455/522
See application file for complete search history.

(56) References Cited

U.S. PATENT DOCUMENTS

| 6,842,460 | B1 * | 1/2005 | Olkkonen et al. | 370/465 |
|---|---|---|---|---|
| 6,950,859 | B1 * | 9/2005 | Bartek et al. | 709/217 |
| 7,127,541 | B2 * | 10/2006 | Govindarajulu et al. | 710/300 |
| 7,136,904 | B2 * | 11/2006 | Bartek et al. | 709/217 |
| 7,502,354 | B1 * | 3/2009 | Maufer | 370/338 |
| 2002/0103893 | A1 | 8/2002 | Frelechoux et al. | |
| 2002/0194384 | A1 * | 12/2002 | Habetha | 709/249 |
| 2003/0129982 | A1 | 7/2003 | Perini | |
| 2003/0224787 | A1 * | 12/2003 | Gandolfo | 455/434 |
| 2004/0122649 | A1 * | 6/2004 | Bartek et al. | 703/23 |
| 2005/0135268 | A1 * | 6/2005 | Simon et al. | 370/254 |
| 2005/0138359 | A1 * | 6/2005 | Simon et al. | 713/156 |
| 2005/0232212 | A1 | 10/2005 | Kang et al. | |
| 2006/0111111 | A1 | 5/2006 | Ovadia | |
| 2006/0159033 | A1 * | 7/2006 | Suzuki et al. | 370/254 |
| 2006/0160555 | A1 * | 7/2006 | Kobayashi et al. | 455/522 |
| 2006/0168446 | A1 * | 7/2006 | Ahonen et al. | 713/163 |
| 2007/0189249 | A1 * | 8/2007 | Gurevich et al. | 370/338 |
| 2007/0206537 | A1 * | 9/2007 | Cam-Winget et al. | 370/331 |
| 2008/0112363 | A1 * | 5/2008 | Rahman et al. | 370/331 |

FOREIGN PATENT DOCUMENTS

| EP | 1 517 490 A2 | 3/2005 |
|---|---|---|
| EP | 1 545 073 A1 | 6/2005 |

OTHER PUBLICATIONS

International Search Report and Written Opinion of International Searching Authority from International Application No. PCT/US2007/087463, dated Apr. 22, 2008.
Radhakrishnan et al., "Protocol for Dynamic Ad-Hoc Networks Using Distributed Spanning Trees", Wireless Networks 9, pp. 673-686, 2003.
U.S. Appl. No. 11/716,095, filed Mar. 9, 2007.
Office Action from U.S. Appl. No. 11/716,095, dated Oct. 16, 2009.
Trezentos et al., "Algorithms for Ad-hoc Piconet Topology Initialization," Vehicular Technology Conference, VTC 2003-Fall, IEEE, vol. 5, 2003.
Office Action from U.S. Appl. No. 11/716,095, dated Apr. 26, 2010.

* cited by examiner

*Primary Examiner* — Jean A Gelin
*Assistant Examiner* — Nathan Taylor

(57) ABSTRACT

Method and improvements for joining wireless mesh networks are provided. In one embodiment, a controller in each network receives a message from a node in its respective network, the message indicating that the respective nodes each received a signal from a node in the other network. Each controller, in response to receiving the respective messages, validates the other network, and responsively (a) directs its respective node to enter a bridging mode and (b) provides its respective node with bridging data that includes a security key for communications between the two nodes. The two nodes then associate with each other using the security key, allowing communications to pass between the two wireless mesh networks.

20 Claims, 9 Drawing Sheets

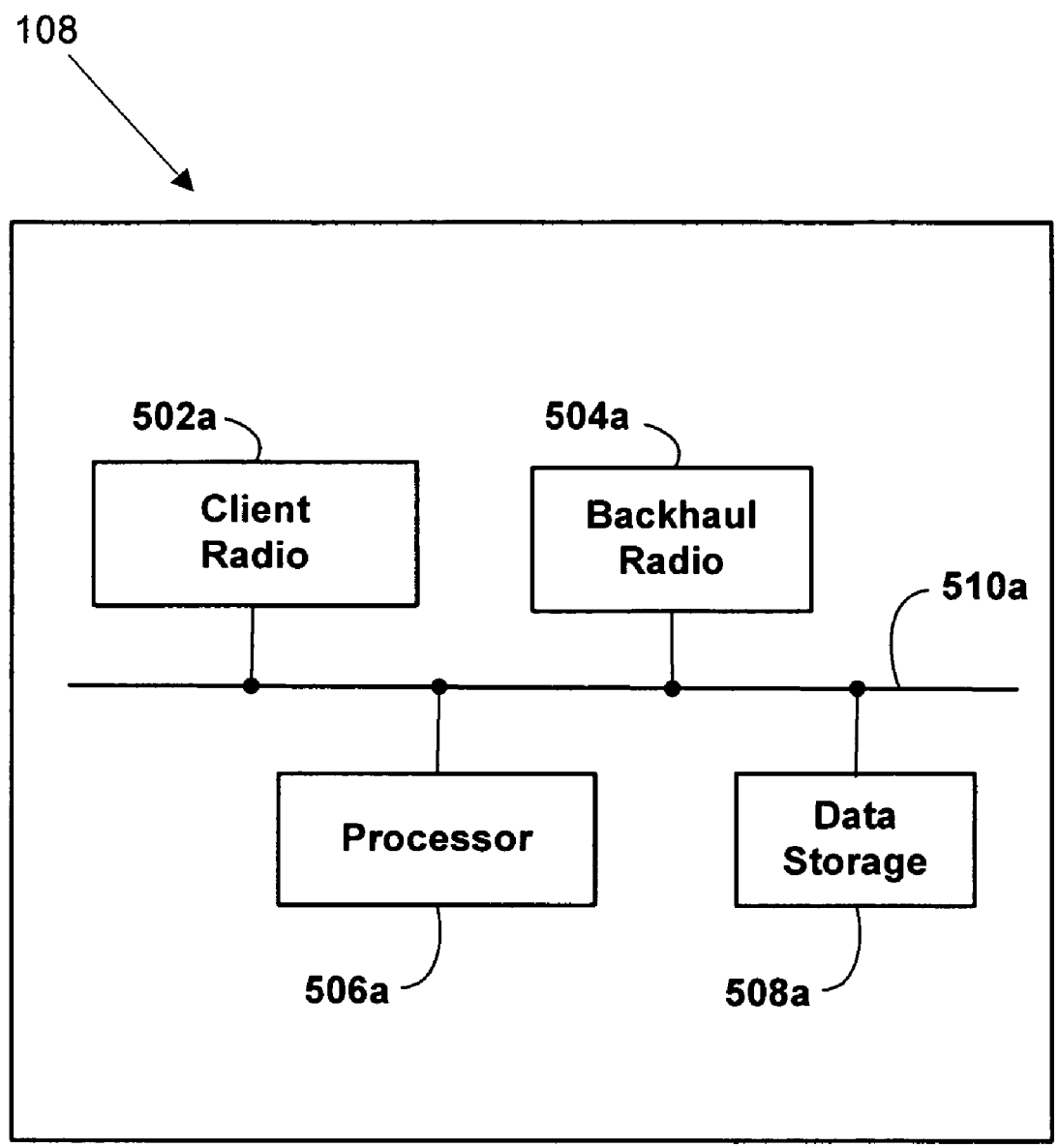

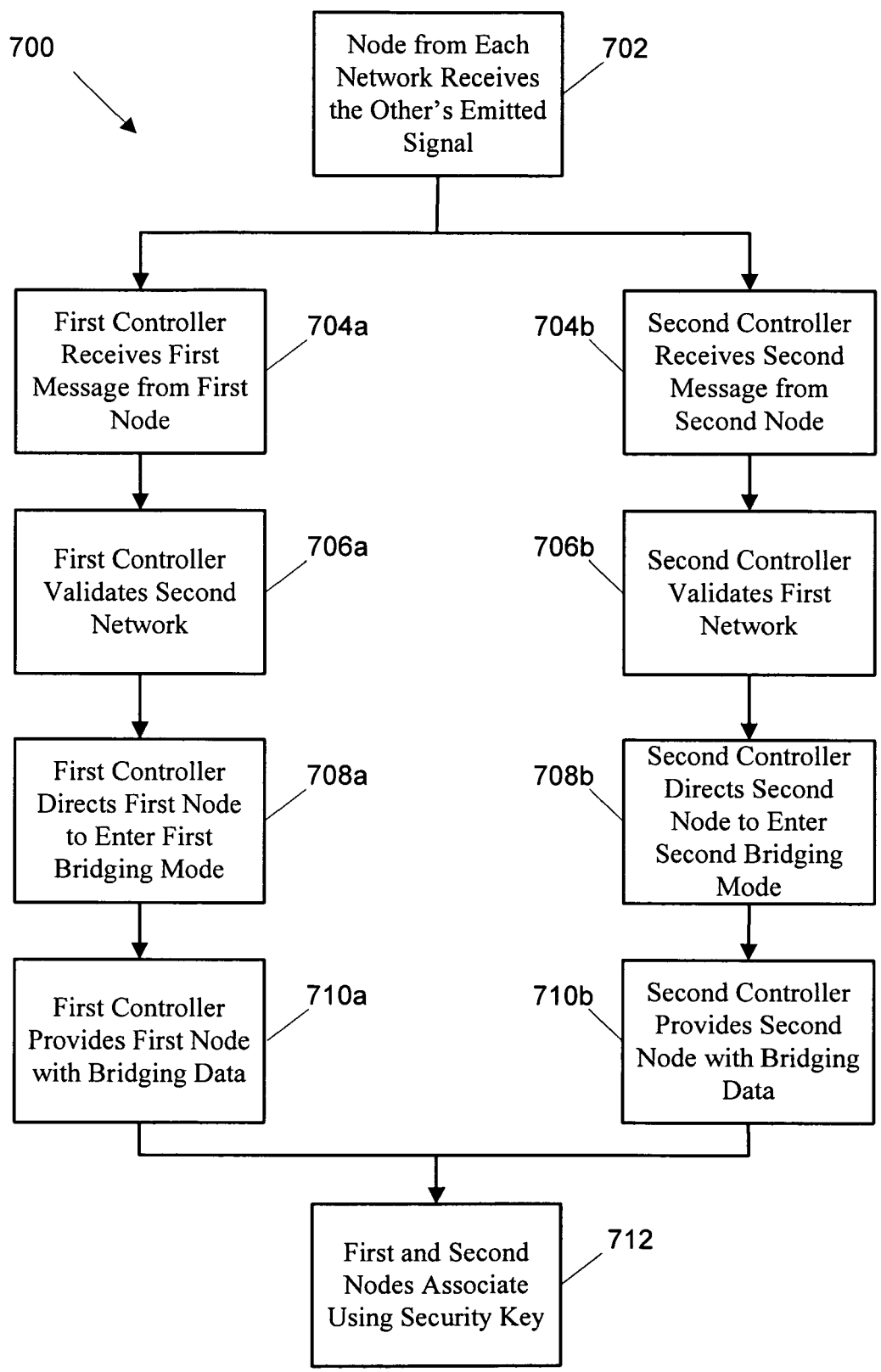

METHODS AND IMPROVEMENTS FOR JOINING WIRELESS MESH NETWORKS

FIELD OF THE INVENTION

The present invention relates to wireless communications and, more particularly, to the arrangement and operation of wireless mesh networks.

BACKGROUND

Wireless-mesh-network technology has become increasingly popular in recent years. As a general matter, a wireless mesh network comprises a plurality of nodes that wirelessly communicate with each other and thereby provide paths to route communications from one point to another. In a typical arrangement, each node of a mesh network is a WI-FI (e.g., 802.11, BLUETOOTH, or other long or short-range wireless protocol) access point (AP) that is individually capable of serving WI-FI client devices such as personal computers, WI-FI phones, and the like. Further, the nodes of the mesh network are arranged to communicate with each other, so as to define inter-node links or "hops" through which client communications can pass. At least one of the nodes may also function as an "edge node" of the mesh network, in that the node has a broadband or other connection to an external network such as the Internet.

With this configuration, a client device can establish communications with a nearest access point in the network and can then communicate through the network with other clients served by the network or with entities on the external network. Communications from the client device would pass to its current serving node and then through any available communication path between mesh-network nodes to ultimately reach the destination client or external network. Likewise, communications from another client device or from the external network may pass through any available communication path among nodes in the mesh network to ultimately reach the serving node and, in turn, the destination client device.

In general, each node of a wireless mesh network has a network address, typically an Internet Protocol (IP) address, and a physical address, typically a Media Access Control (MAC) address. Using well-known network-routing principles, the nodes alert each other of their IP addresses and their available connections, and each node maintains an Address Resolution Protocol (ARP) table that maps MAC addresses to IP addresses, and generally establishes which hops are available for routing communications. Thus, when a node receives a communication destined for a particular IP address, the node can determine which next node should receive the communication and can send the communication to that next node, and so forth until the communication reaches its destination.

In general, a WI-FI access point regularly emits WI-FI signals (e.g., WI-FI beacons or pilot signals) that designate the access point's service set identifier (SSID), MAC address, and perhaps other information. In basic operation, when an access point or other WI-FI node detects such WI-FI signals, the access point or node can use the information in the signals to establish connectivity with the broadcasting access point, so as to communicate with it. Further, when an access point or other WI-FI node is seeking to find or associate with an access point or network, the node will broadcast a "discovery message" (using, e.g., the Lightweight Access Point Protocol) that provides any other nodes in its range with pertinent information such as the node's MAC address, for example. In basic operation, another node that detects such a discovery message may then programmatically use that information to establish connectivity with the broadcasting access point, so as to communicate with it.

A wireless mesh network may also include a central network controller ("controller"), which functions to manage the network, such as to direct the mesh-network nodes to use particular SSIDs and other network settings, manage what nodes are allowed to function as members of the mesh network, control the power levels used by mesh-network nodes, control the radio channel each mesh-network node uses, monitor the airwaves for unknown nodes, and allow clients to join the network. The controller may be embodied in one of the access points in the mesh network, or the controller may be embodied in a separate unit connected through a wireless or wired link with at least one of the mesh-network nodes. Like other elements of the mesh network, the controller may have an IP address and MAC address in the mesh network. Further, the controller may have a unique, designated controller ID, which distinguishes it from controllers in other mesh networks. In a mesh network that includes such a controller, the access-point nodes of the network may include the controller ID in their WI-FI beacons, together with parameters such as those noted above.

SUMMARY

Methods and improvements for joining mesh networks are provided. In one embodiment, the invention could take the form of a method. In accordance with the method, a first wireless mesh network ("first network") is joined with a second wireless mesh network ("second network"). The first network may include a first-network controller and a plurality of first-network nodes, and the second network may include a second-network controller and a plurality of second-network nodes.

According to the method, the first-network controller receives from a given first-network node a first message, the first message indicating that the given first-network node received a first signal from a given second-network node. Responsive to receiving the first message, the first-network controller (i) validates the second network and (ii) responsive to validating the second network, (a) directs the given first-network node to enter a first bridging mode and (b) provides the given first-network node with first bridging data that includes a security key for communications between the given first-network node and the given second-network node.

Likewise, the second-network controller receives from the given second-network node a second message, the second message indicating that the given second-network node received a second signal from the given first-network node. Responsive to receiving the second message, the second-network controller (i) validates the first network and (ii) responsive to validating the first network, (a) directs the given second-network node to enter a second bridging mode and (b) provides the given second-network node with second bridging data that includes the same security key.

The given first-network node and the given second-network node then associate with each other using the security key, thereby allowing communications to be securely passed between the first network and the second network.

These as well as other aspects and advantages will become apparent to those of ordinary skill in the art by reading the following detailed description, with appropriate reference to the accompanying drawings.

BRIEF DESCRIPTION OF THE DRAWINGS

Embodiments of the invention are described herein with reference to the drawings, in which:

FIGS. 5a and 5b are block diagrams of mesh-network nodes for use in carrying out an embodiment of the invention;

FIG. 7 is a flow chart provided to illustrate some of the functions that may be carried out in accordance with an embodiment of the invention.

DETAILED DESCRIPTION

I. Overview

At times, it may be desirable to join two or more wireless mesh networks, to allow communications to pass between the mesh networks. This may occur, for instance, in a disaster recovery scenario, where vehicles containing mesh-network nodes are brought into the area to facilitate emergency communication through a mesh network, and where multiple such mesh networks may be established. Each mesh network may generally define a respective network coverage area or "bubble." It is possible through movement of the nodes or for other reasons that the bubble defined by one such mesh network may begin to overlap with the bubble defined by another such mesh network.

In one embodiment, when two mesh networks overlap, at least one node in each network may detect the presence of the other network by receiving a WI-FI signal from at least one node in the other network. In this scenario, each controller may receive a message from its respective node, the message indicating that the respective node received a WI-FI signal from a node in the other network. In response to receiving the message, each network controller may then validate the other network, and, in response to validating the other network, each controller may direct the node in its own network to enter a bridging mode.

Each such node may have a dual-radio configuration, including a client WI-FI radio ("client radio") arranged to communicate with client devices, and a backhaul WI-FI radio ("backhaul radio") arranged to engage in backhaul communications with the controller of the mesh network and other nodes (or devices, more generally). In the bridging mode, each node may (i) use its client radio to communicate with the node in the other network, and (ii) use its backhaul radio to communicate with the controller of its network and other nodes. Additionally, each node may pass communications between its client radio and its backhaul radio. Preferably, using two networks as an example, the controller of each network will validate the other network, and at least one node in each network will enter the bridging mode.

Furthermore, as each controller directs its respective node to enter bridging mode, each controller will provide its node with bridging data that includes at least one security key (e.g., a digital security key, a password, or other secret information) to secure communications between the nodes of each network. Advantageously, both controllers will provide their respective node with the same security key(s), as predefined at each of the controllers. The bridging data may also, for instance, include an indication of a channel for the nodes to use for communications with one another. Consequently, the two nodes (one in each network) associate with each other using the security key(s), thereby allowing communications to securely pass between the first network and the second network.

II. Exemplary System Architecture

Figure 1:
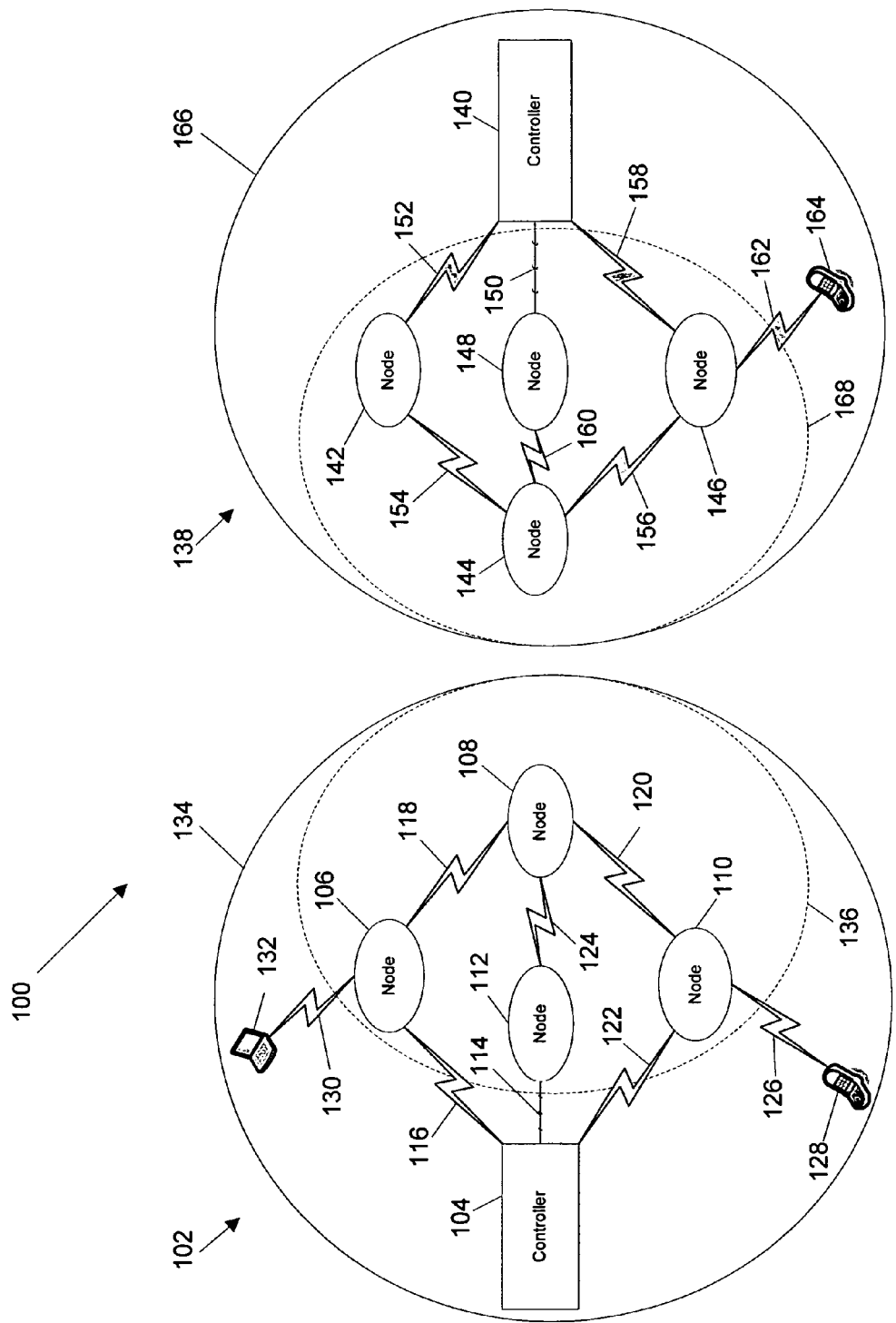
FIG. 1 is a block diagram depicting a network arrangement in which an embodiment of the invention can be implemented.

An embodiment of the present invention may be carried out in a system 100 as shown in FIG. 1. As illustrated, the system 100 includes two wireless mesh networks ("mesh networks"), namely, a first mesh network 102 and a second mesh network 138.

Mesh network 102 includes a controller 104 and mesh-network nodes ("nodes") 106, 108, 110, and 112. Controller 104 is communicatively coupled to the nodes 106 and 110 via wireless communication links 116 and 122, respectively, and node 112 via a wired communication link 114. Further, node 108 is communicatively coupled to nodes 106, 112, and 110 via wireless communication links 118, 124, and 120, respectively. Also, node 110 is communicatively coupled to a client device 128 via a wireless communication link 126, and node 106 is communicatively coupled to a client device 132 via a wireless communication link 130.

Additionally, node 108 defines a coverage area, or bubble, 136, which may comprise radiation patterns emitted by node 108. More generally, coverage area 136 may comprise a geographical area surrounding node 108. Entities (or devices) within range of the geographical area associated with coverage area 136 may communicate with node 108. Furthermore, entities outside the range of the geographical area may still communicate with node 108, so long as a communication path exists between node 108 and the entity. For instance, as depicted in FIG. 1, coverage area 136 of node 108 encompasses nodes 106, 112, and 110. As such, node 108 may communicate with each of the devices. Additionally, although coverage area 136 of node 108 does not encompass client device 128, for instance, the coverage area (not depicted) of node 110 does encompass the client device. As such, node 108 and client device 128 may communicate via a communication path traversing node 110. Node 108 may also communicate with controller 104 via a communication path traversing node 106, 112, or 110.

Further, each of the nodes 106, 108, 110, and 112 may define more than one coverage area. For instance, node 108 may comprise a backhaul radio for communicating with other nodes and/or a controller, and a client radio for communicating with client devices. The backhaul radio and client radio of node 108 may each define their own coverage area (not individually depicted), and the coverage areas may vary in size and shape.

Similarly, mesh network 102 also defines a coverage area 134, which may comprise radiation patterns cooperatively emitted by controller 104 and each of the nodes 106, 108, 110, and 112. Entities within range of the geographical area associated with coverage area 134 are necessarily within the coverage area of at least one of controller 104 and nodes 106, 108, 110, and 112. If an entity comes within range of the coverage area of at least one of controller 104 and nodes 106, 108, 110, and 112, the entity may then form a communication path, and thus communicate with, the other entities associated with mesh network 102 (e.g., controller 104, each of the nodes 106, 108, 110, and 112, and each of the client devices 128 and 132).

Likewise, mesh network 138 comprises a controller 140 and nodes 142, 144, 146, and 148. Controller 140 is communicatively coupled to the nodes 142 and 146 via wireless communication links 152 and 158, respectively, and node 148 via a wired communication link 150. Further, node 144 is communicatively coupled to nodes 142, 148, and 146 via wireless communication links 154, 160, and 156, respectively. Also, node 146 is communicatively coupled to a client device 164 via a wireless communication link 162.

Additionally, node 144 defines a coverage area 168, which may comprise radiation patterns emitted by node 144. More generally, coverage area 168 may comprise a geographical area surrounding node 144. Entities within range of the geographical area associated with coverage area 168 may communicate with node 144. Furthermore, entities outside the range of the geographical area may still communicate with node 144, so long as a communication path exists between node 144 and the entity. For instance, as depicted in FIG. 1, coverage area 168 of node 144 encompasses nodes 142, 148, and 146. As such, node 144 may communicate with each of the devices. Additionally, although coverage area 168 of node 144 does not encompass client device 164, the coverage area (not depicted) of node 146 does encompass the client device. As such, node 144 and client device 164 may communicate via a communication path traversing node 146. Node 144 may also communicate with controller 140 via a communication path traversing node 142, 148, or 146.

Further, each of the nodes 142, 144, 146, and 148 may define more than one coverage area. For instance, node 144 may comprise a backhaul radio for communicating with other nodes and/or a controller, and a client radio for communicating with client devices. The backhaul radio and client radio of node 144 may each define their own coverage area (not individually depicted), and the coverage areas may vary in size and shape.

Similarly, mesh network 138 also defines a coverage area 166, which may comprise radiation patterns cooperatively emitted by controller 140, and each of the nodes 142, 144, 146, and 148. Entities within range of the geographical area associated with coverage area 166 are necessarily within the coverage area of at least one of controller 140 and nodes 142, 144, 146, and 148. If an entity comes within range of the coverage area of at least one of controller 140 and nodes 142, 144, 146, and 148, then the entity may form a communication path, and thus communicate with, the other entities associated with mesh network 138 (e.g., controller 140, each of the nodes 142, 14.4, 146, and 148, and the client device 164).

It should be understood, of course, that this and other arrangements described herein are provided for purposes of example only. As such, those skilled in the art will appreciate that other arrangements and other elements (e.g. nodes, controllers, client devices, external networks, machines, interfaces, communication links, functions, orders of functions, etc.) can be used instead, and some elements may be omitted altogether. Further, many of the elements described herein are functional entities that may be implemented as discrete or distributed components, in conjunction with other components, as hardware, firmware and/or software, and in any suitable combination and location.

Each of the entities of mesh network 102 may be arranged to communicate with one another. Furthermore, each of the nodes 106, 108, 110, and 112 may be arranged to communicate with, and thus serve, one or more client devices (e.g., laptop computers or WI-FI phones). Client devices 128 and 132, which are served by nodes 110 and 106 respectively, may also communicate with one another, and the communications may traverse any available path between the two client devices. For example, client device 128 may transmit a signal to client device 132 via a communication path traversing nodes 110, 108, and 106.

In addition to enabling client-device communications, each of the nodes 106, 108 110, and 112 may regularly (or sporadically) emit WI-FI signals (e.g., WI-FI beacons or pilot signals). A WI-FI signal emitted by node 108, for example, may designate the node's SSID, MAC address, controller ID, the channel on which the node is operating, and perhaps other information. If a given node is not associated with a controller, for example, then the given node may broadcast a discovery message in an effort to find or associate with another node, controller, and/or network. The discovery message may provide the other nodes within the given node's coverage area with pertinent information, such as the node's MAC address.

In addition to emitting WI-FI signals, each of the nodes 106, 108, 110, and 112 may detect WI-FI signals not only from one another, but also from other nodes (or other devices, more generally) that are not currently members of mesh network 102 but that are still within the respective node's coverage area. A WI-FI signal that is (a) emitted from a node that is not currently a member of mesh network 102 and (b) detected by node 108, for instance, may be emitted in at least two different ways: (i) the signal may be emitted by a node that is a member of some other mesh network (e.g., mesh network 138) or (ii) the signal may be emitted by a node that is not currently a member of another mesh network. If the signal is emitted from a node that is not currently a member of another mesh network, the signal may comprise a discovery message seeking to discover a node, controller, and/or network with which to associate and/or join.

Furthermore, each of the nodes 106, 108, 110, and 112 may report to controller 104 all (or some) of the WI-FI signals that the respective nodes detect, including discovery messages. For instance, each of the nodes 106, 108, 110, and 112 may scan the airwaves and, upon detecting a WI-FI signal from another node, send to controller 104 a message that indicates information relating to the other node (and perhaps that other node's controller, if the other node is associated with one). The message may contain various types of information. For instance, the message may include one or more identifiers for the node and/or controller with which the node is associated. An identifier may comprise the channel, SSID, MAC address, controller ID and/or other pertinent information relating to the other node or controller. Additionally, the message sent, for instance, from node 108 to controller 104 may take various forms. For instance, the message may take the form of the WI-FI signal itself, in which case the message is a simple pass-through of the WI-FI signal. Alternatively, the message may encapsulate the WI-FI signal with other data, such as a header. Additionally, the message may be altogether different from the WI-FI signal.

Through this process, controller 104 may thus learn of WI-FI signals emitted from nodes that are already members of mesh network 102, and WI-FI signals emitted by nodes that are not currently members of the controller's mesh network. Furthermore, upon receiving a message that indicates information about a node or controller not associated with mesh network 102, controller 104 may then record information about the other node or controller for subsequent evaluation.

For instance, after recording information about the other node or controller, controller 104 may determine whether or not to join the other node with mesh network 102. Making the decision to add the other node to mesh network 102 may comprise, for example, determining whether the other node, or the controller with which the other node is associated, is trusted (or friendly or known), and should thus be allowed to operate on mesh network 102, or whether the other node or controller is unknown (or not trusted), and thus should not be allowed to operate on mesh network 102.

To evaluate whether the other node or controller is trusted, controller 104 may refer to peering data. Specifically, after receiving a message that includes one or more identifiers about another node or controller not currently associated with mesh network 102, and after recording such information, controller 104 may then determine whether the peering data includes the one or more identifiers for the node or controller.

Figure 2:
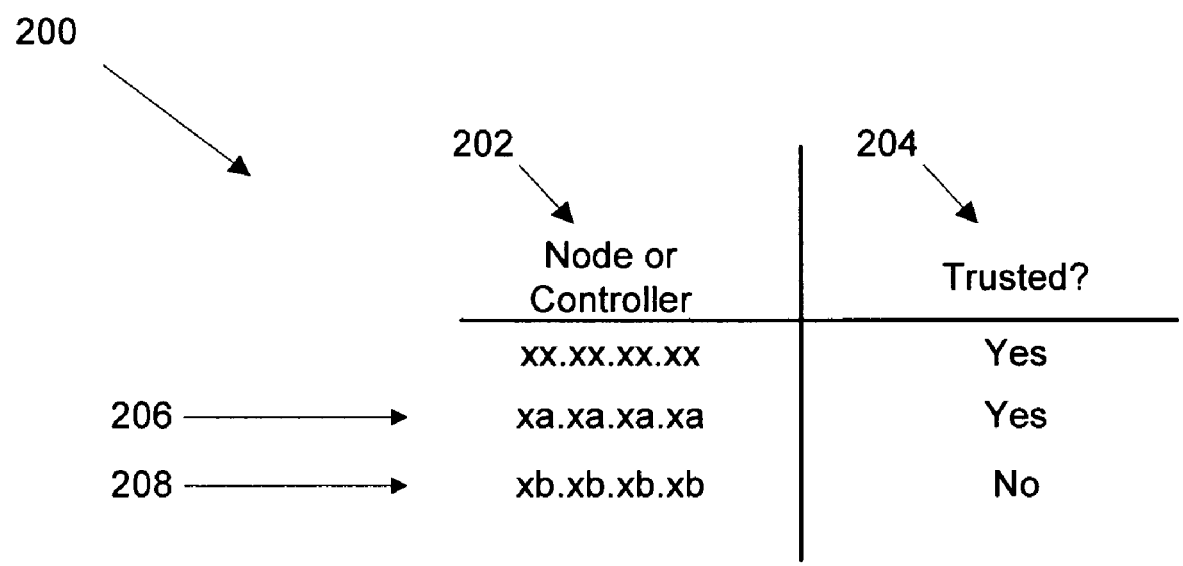
FIG. 2 is an illustration of a peering data table for use in carrying out an embodiment of the invention.

FIG. 2 is an illustration of a peering data table for use in carrying out an embodiment of the invention. This peering data may be initially established through manual data entry and may then be updated manually or dynamically over time. Generally, a peering data table may include one or more identifiers for various nodes or controllers, and may indicate whether each node or associated controller is trusted (i.e., friendly or known) or otherwise unknown. Alternatively, the table may only include identifiers for trusted nodes or controllers, and thus the absence of an identifier for a node or controller from the table may indicate that the node or controller is unknown or not trusted.

For example, in peering data table 200, column 202 includes identifiers for various nodes or controllers, and column 204 indicates whether the identifier corresponds to a trusted node or controller. As depicted in peering data table 200, row 206 indicates that node or controller xa.xa.xa.xa is trusted, while row 208 indicates that node or controller xb.xb.xb.xb is not trusted. It should be understood that identifiers representing the various nodes and controllers may take various forms. Further, other examples of peering data tables are also possible, as well as other ways of determining whether a node or controller is trusted or friendly. Additionally, the peering data may include other information, such as bridging data and security key information.

Generally, if controller 104 determines that the other node is trusted, it may then send a response back to node 108, which received the discovery message, for instance, authorizing node 108 to associate with the other node and to make the other node a member of the mesh network 102. The other node would then communicate using one or more parameters of the mesh network 102, would become controlled by controller 104, and would exchange routing and networking information (e.g., ARP tables and TCP/IP communications) with node 108. On the other hand, if controller 104 determines that the other node is unknown or not trusted, or belongs to a controller that is unknown or not trusted, controller 104 may ignore the message about the other node or direct node 108 to disregard the received discovery message.

Likewise, controller 140 and each of the nodes 142, 144, 146, and 148 of mesh network 138 may operate in a similar manner as controller 104 and each of the nodes 106, 108, 110, and 112 of mesh network 102, respectively.

Figure 3:
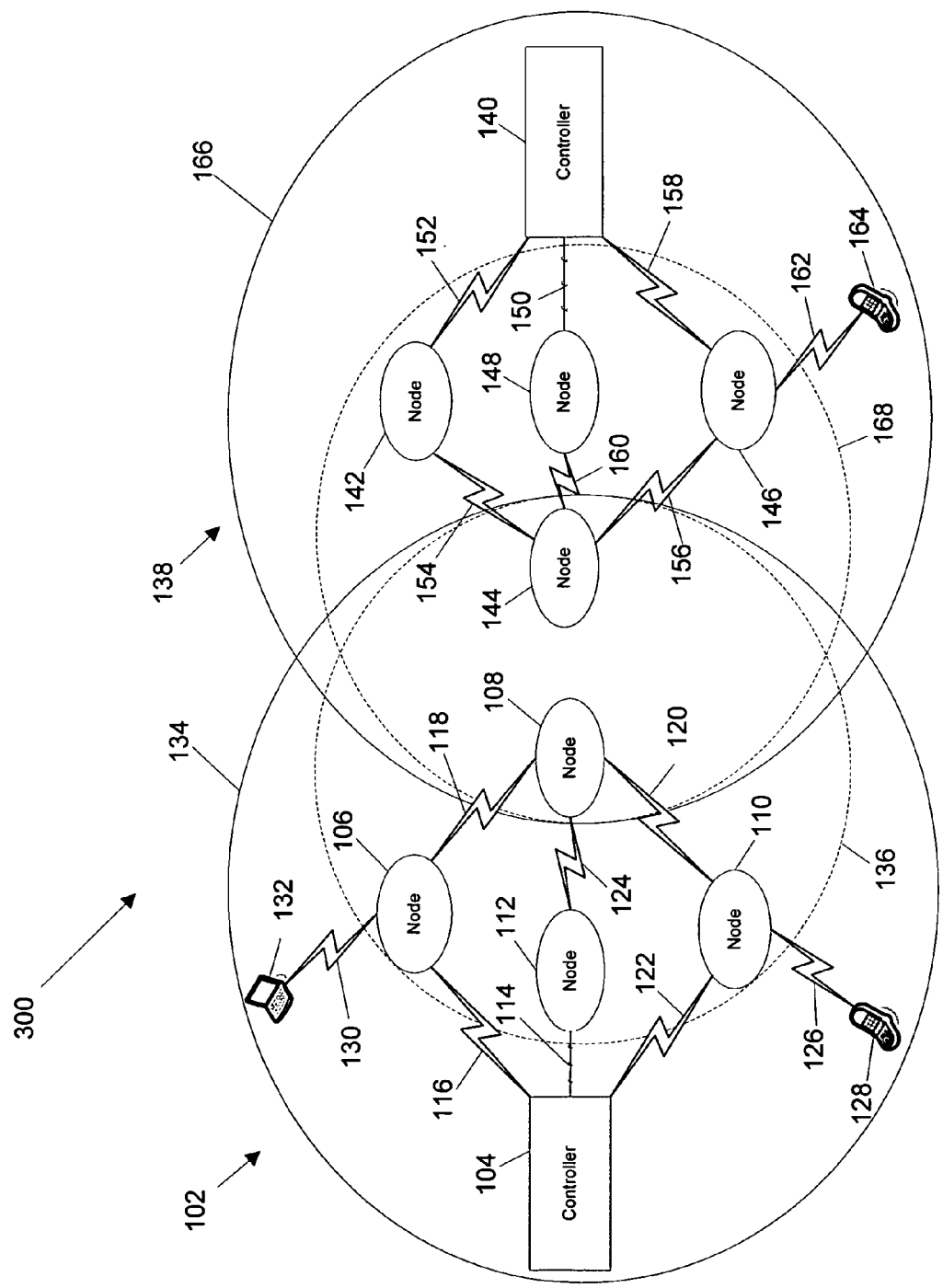
FIG. 3 is a block diagram depicting a network arrangement in which an embodiment of the invention can be implemented.

FIG. 3 depicts a scenario 300 where node 108 of mesh network 102 and node 144 of mesh network 138 each detect the other's emitted WI-FI signals. However, in this scenario, rather than having node 144 leave mesh network 138 to join mesh network 102, for example, it may be desirable to join mesh network 102 and mesh network 138 so that communications can pass between the mesh networks.

Figure 6:
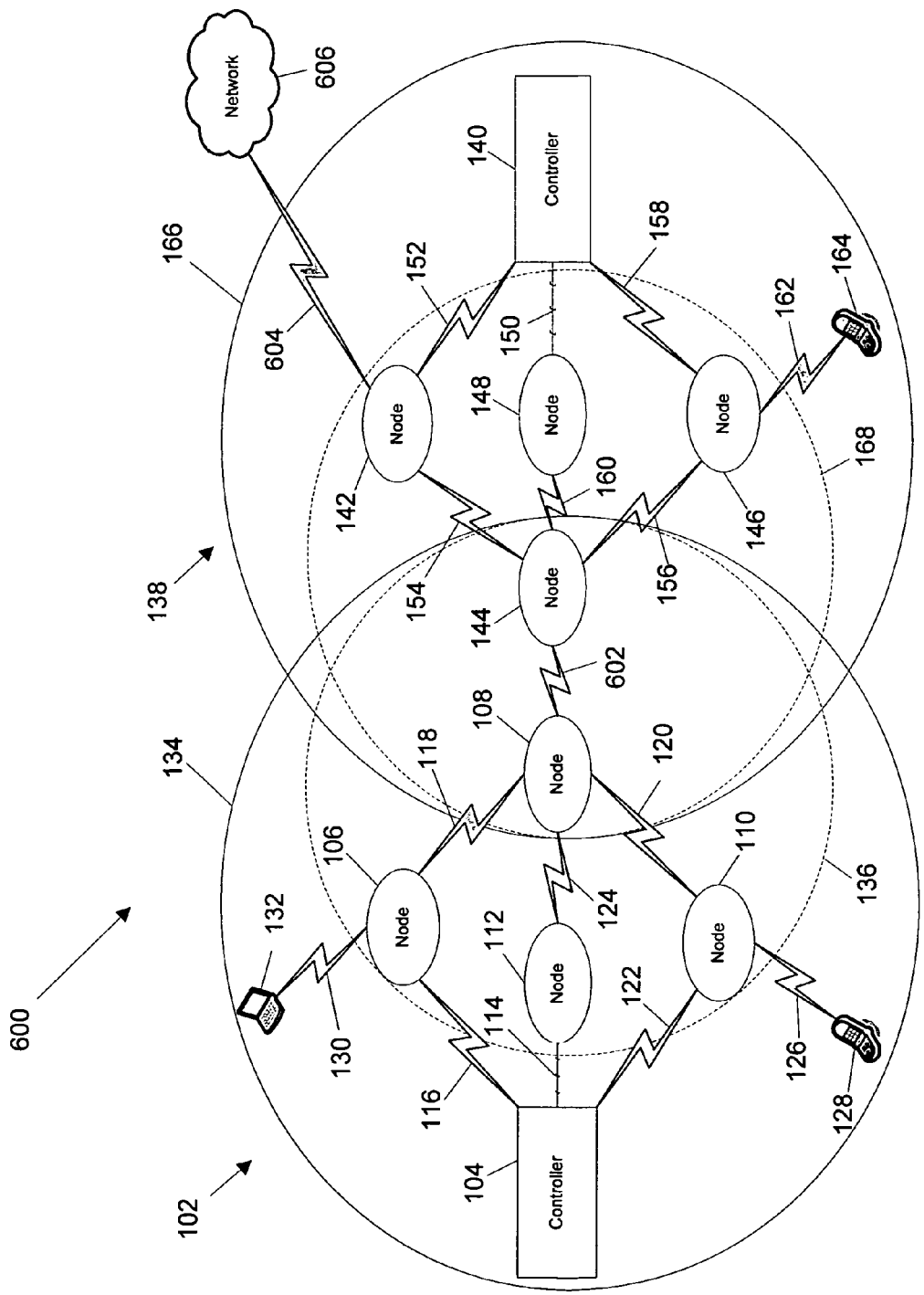
FIG. 6 is a block diagram depicting a network arrangement in which an embodiment of the invention can be implemented.

The following describes methods and improvements to join mesh networks 102 and 138 so that communications can pass between the two networks. Further, the following also describes embodiments of entities that may be used to carry out such a function. As depicted in FIG. 6, once the mesh networks 102 and 138 have been bridged via a wireless communication link 602, both of the controllers 104 and 140 may continue to operate to control their respective mesh networks, and communications may securely pass between the two mesh networks. For instance, once the mesh networks are bridged, client device 128, which is served by mesh network 102, may then pass communications to client device 164, which is served by mesh network 138, over a communication path that includes nodes 108 and 144. Additionally, if node 142 of mesh network 138 is in communication with a network 606, such as a packet-switched network, via a wireless communication link 604, then client device 128 of mesh network 102 may communicate over the network 606 over a communication path that includes nodes 108 and 144.

III. Exemplary Controllers

Figure 4A:
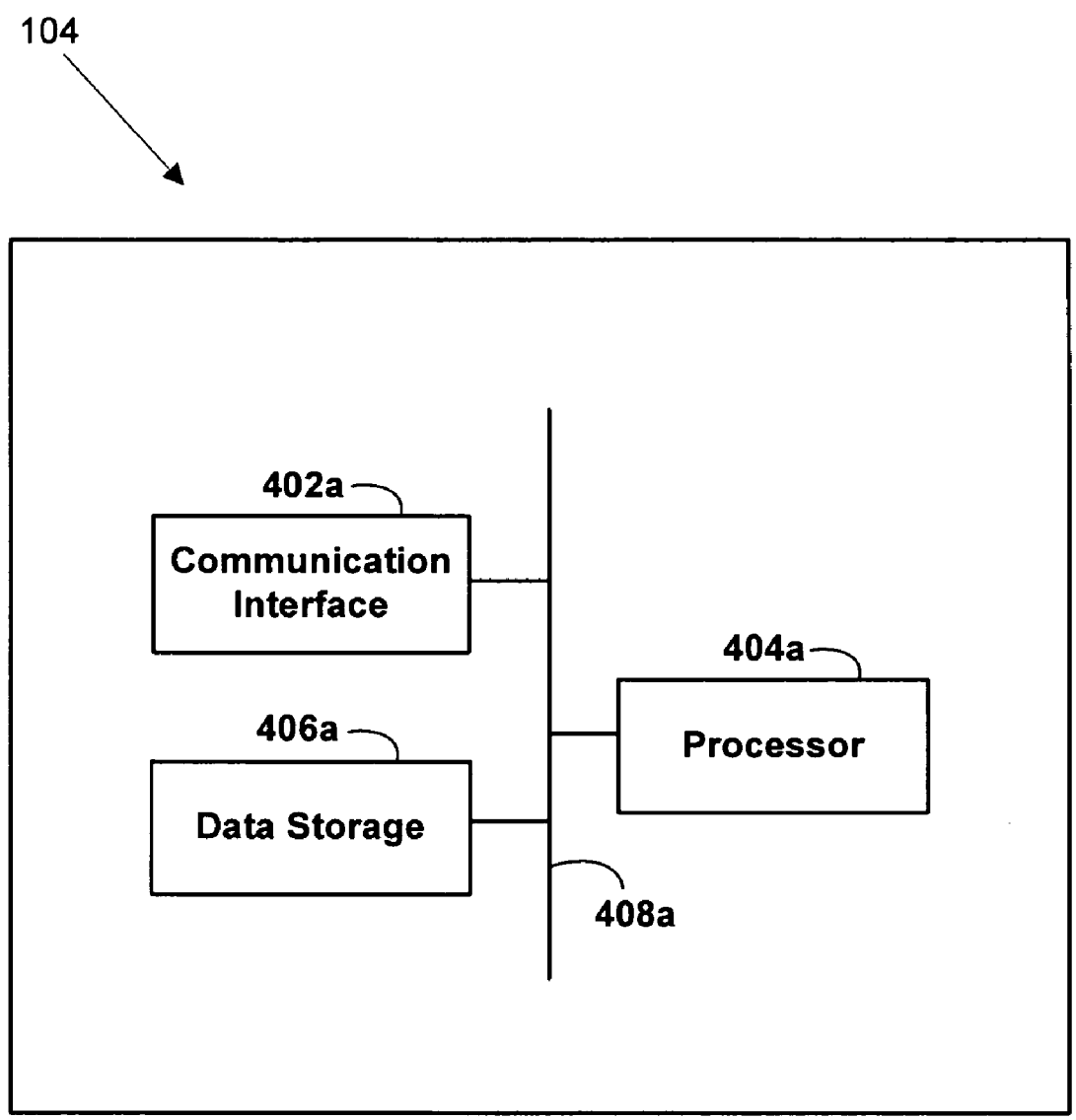
FIGS. 4a and 4b are block diagrams of central network controllers for use in carrying out an embodiment of the invention.
Figure 4B:
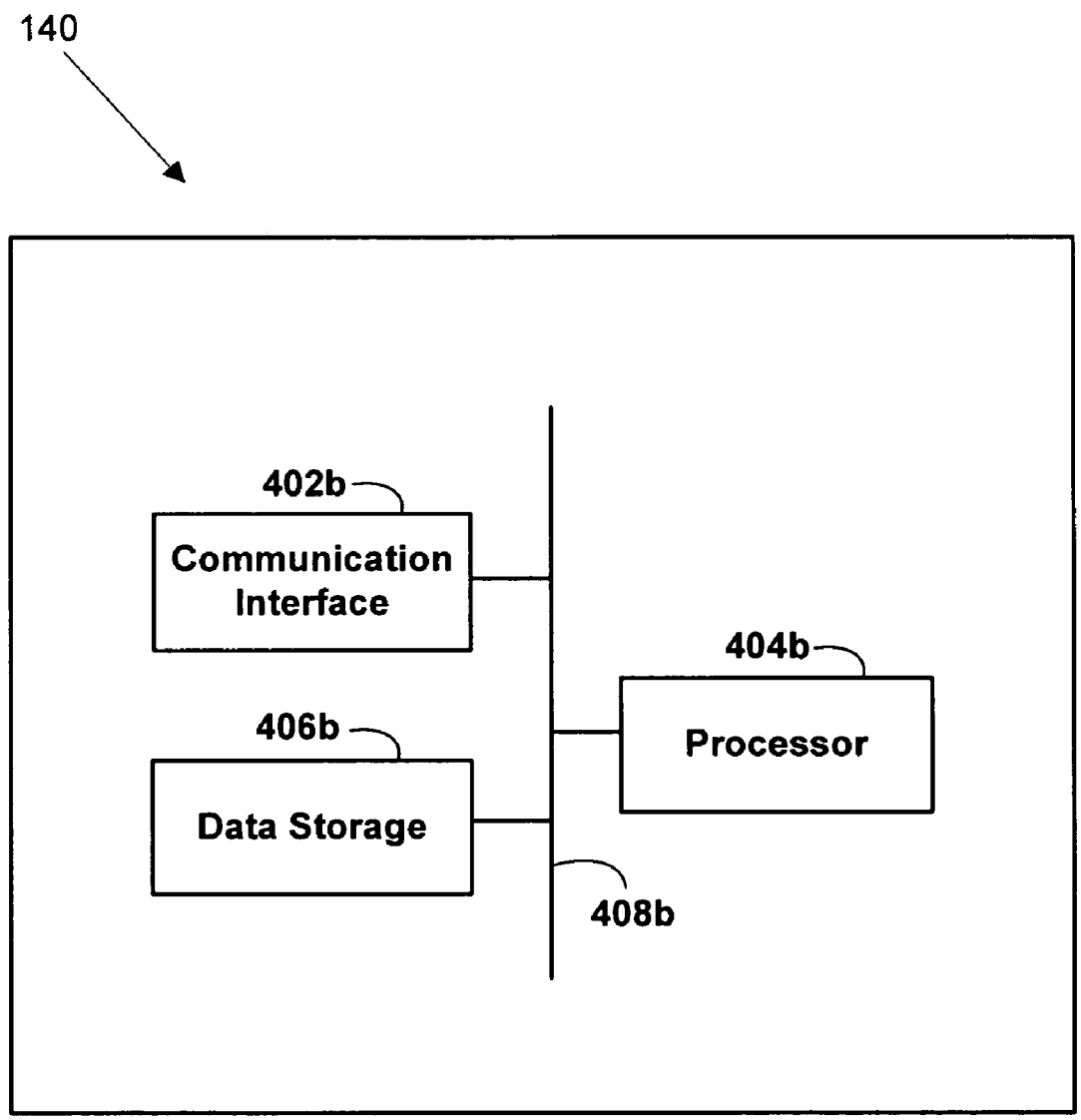

FIGS. 4a and 4b are block diagrams of controllers 104 and 140, respectively, for use in carrying out an embodiment of the present invention. As depicted in FIG. 4a, controller 104 includes a communication interface 402a, a processor 404a, and data storage 406a, all linked together via a system bus, network, or other connection mechanism 408a.

The communication interface 402a provides an interface between other portions of controller 104 and entities that are associated with controller 104, or entities that are not currently associated with controller 104 (i.e., entities that are associated with a different controller or mesh network, or entities that are not associated with a controller or mesh network). Further, the communication interface 402a may be operable to receive a message from a given node associated with controller 104, the message indicating that the given node received a signal from a node not currently associated with controller 104. Additionally, the communication interface 402a may enable communications with other network entities that are not shown in FIGS. 1, 3, and 6.

The processor 404a may comprise one or more processors (e.g., one or more general-purpose processors and/or one or more specialized (e.g., dedicated) processors). The processor 404a is arranged to carry out functions described herein, and may do so by executing computer-readable program instructions stored in data storage 406a and/or in firmware. In response to executing the program instructions, the processor 404a may interact with the communication interface 402a, and/or the connection mechanism 408a so as to carry out functions described herein.

The data storage 406a may comprise a computer-readable medium, and may also comprise volatile and/or non-volatile storage components, such as optical, magnetic, organic, flash, or other memory or disc storage. The computer-readable medium of data storage 406a may be integrated in whole or in part with the processor 404a.

Data storable on data storage 406a may be arranged as program instructions executable by the processor 404a. As an example, program instructions executable by the processor 404a may include: (i) instructions to receive from a given node associated with controller 104 a message, the message indicating that the given node received a signal from a node associated with another network (and controller), (ii) responsive to receiving the message, instructions to validate the other network and/or controller, (iii) instructions to direct the given node to enter a bridging mode, and (iv) instructions to provide the given node with bridging data that includes at least one security key for communications between the given node and the other node.

Data storage 406a may store various types of reference data as well. For example, the data may include bridging data (e.g., an indication of a channel for a given node to use for communications with another node), peering data, and one or more security keys (e.g., WPA security key(s), password(s), or other type of encryption or authentication data). Other types of reference data may be stored on data storage 406a as well.

Similarly, as depicted in FIG. 4b, controller 140 includes a communication interface 402b, a processor 404b, and data storage 406b, all linked together via a system bus, network, or other connection mechanism 408b. These elements of controller 140 may operate, respectively, in a manner similar to that described above with respect to the elements of controller 104.

IV. Exemplary Nodes

Figure 5B:
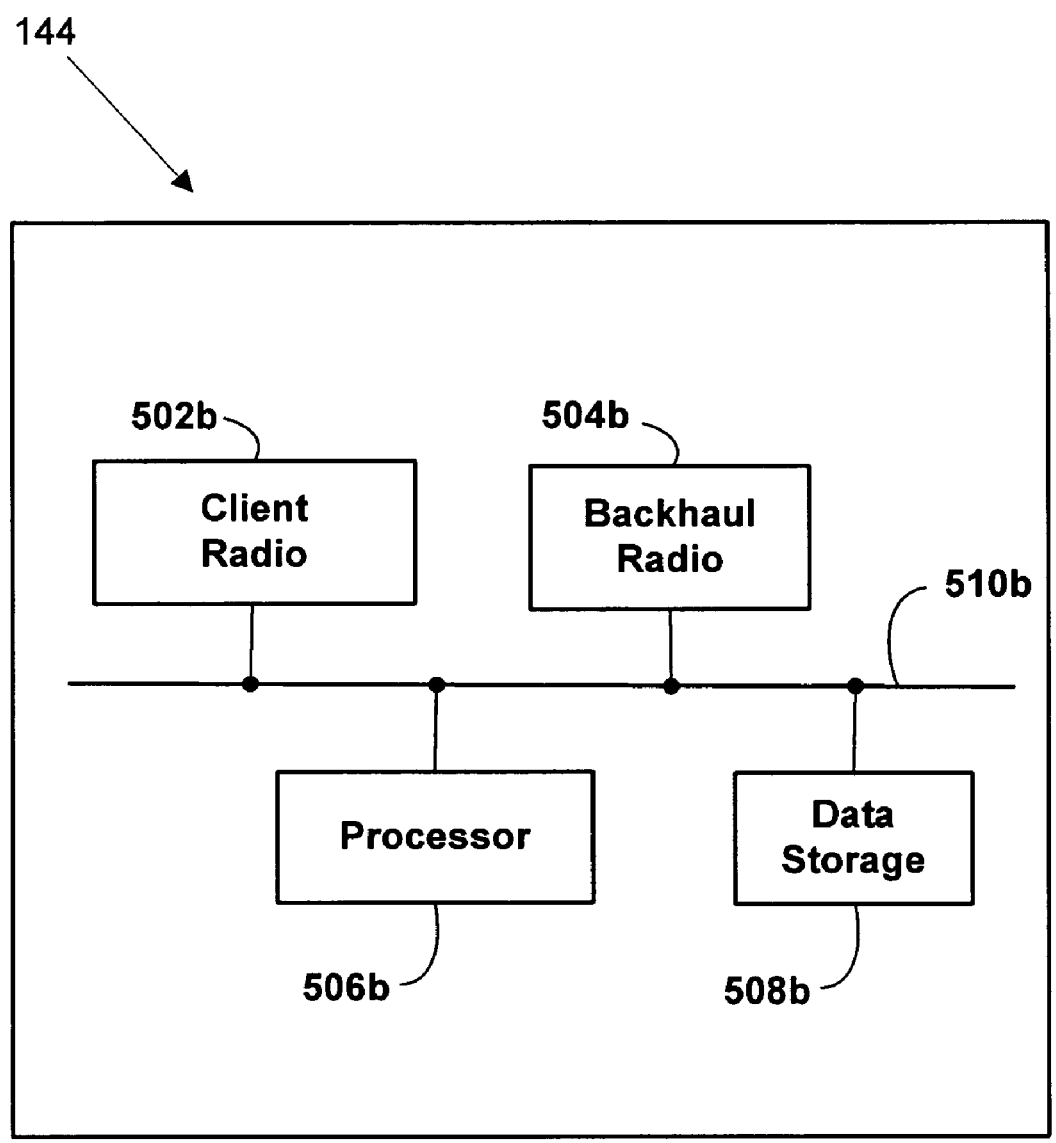

FIGS. 5a and 5b are block diagrams of nodes 108 and 144, respectively, for use in carrying out an embodiment of the present invention. As described above, node 108 may be associated with controller 104, and node 144 may be associated with controller 140. As depicted in FIG. 5a, node 108 includes a client radio 502a, a backhaul radio 504a, a processor 506a, data storage 508a, all linked together via a system bus, network, or other connection mechanism 510a.

The client radio 502a provides an interface between (i) one or more client devices (or devices, more generally) served by node 108 and (ii) other elements of node 108. Further, the client radio 502a may be communicatively coupled to the backhaul radio 504a, so that communications may pass between the two radios. Additionally, the client radio 502a may be able to enter a bridging mode, and use bridging data and security-key information to bridge communications with 144 via a client radio 502b, for instance. Also, the client radio 502a may enable communications with other network entities not necessarily depicted in FIGS. 1, 3 and 6.

The backhaul radio 504a provides means for node 108 to engage in backhaul communications with controller 104, entities associated with controller 104, entities associated with a different controller or mesh network, and entities that are not associated with a controller or mesh network. The backhaul radio 504a may also be communicatively coupled to the client radio 502a to allow communications to pass between the two radios. Additionally, the backhaul radio 504a may be operable to receive communications from controller 104. The communications may comprise, for example, bridging data, security key information, instructions for client radio 502a to enter bridging mode, and other pertinent information. Also, the backhaul radio 504a may enable communications with other network entities not necessarily depicted in FIGS. 1, 3, and 6.

The processor 506a may comprise one or more processors (e.g., one or more general-purpose processors and/or one or more specialized (e.g., dedicated) processors). The processor 506a is arranged to carry out functions described herein, and may do so by executing computer-readable program instructions stored in data storage 508a and/or in firmware. In response to executing the program instructions, the processor 506a may interact with the client radio 502a, the backhaul radio 504a, and/or connection mechanism 510a so as to carry out functions described herein.

The data storage 508a may comprise a computer-readable medium, and may also comprise volatile and/or non-volatile storage components, such as optical, magnetic, organic, flash, or other memory or disc storage. The computer-readable medium of data storage 508a may be integrated in whole or in part with the processor 506a.

Data storable on data storage 508a may be arranged as program instructions executable by the processor 506a. As an example, program instructions executable by the processor 506a may include: (i) instructions to receive bridging data from controller 104, (ii) instructions to enter bridging mode using the bridging data provided by controller 104, (iii) upon being directed by controller 104 to enter bridging mode, instructions to use the client radio 502a to communicate with node 144 and use the backhaul radio 504a to communicate with controller 104, and/or with at least one of the other nodes served by controller 104, (iv) instructions to use at least one security key for communications between node 108 and node 144, (v) instructions to securely pass communications between node 108 and node 144, (vi) instructions to communicate bearer data securely between node 108 and node 144, and (vii) instructions to exchange ARP messages with node 144.

Data storage 508a may store various types of reference data as well. For example, the data may include bridging data (e.g., an indication of a channel for node 108 to use for communications with node 144). The data may also include ARP tables, which may include routing data and other information. Additionally, the data may comprise one or more security keys, such as a digital security key, password, or other type of encryption or authentication data. Other types of bridging data, ARP tables, and security keys are also possible, along with other types of reference data stored on the data storage 508a as well.

Similarly, as depicted in FIG. 5b, node 144 includes a client radio 502b, a backhaul radio 504b, a processor 506b, data storage 508b, all linked together via a system bus, network, or other connection mechanism 510b. These elements of node 144 may operate, respectively, in a manner similar to that described above with respect to the elements of node 108.

V. Exemplary Operation

In operation, node 108 of mesh network 102 detects the presence of mesh network 138 by receiving a WI-FI signal emitted from node 144, and node 144 likewise detects the presence of mesh network 102 by receiving a WI-FI signal emitted from node 108. The nodes 108 and 144 will then each send a message to controllers 104 and 140, respectively, each message indicating that the respective node received a WI-FI signal from the other node. Responsive to receiving the message from node 108, controller 104 will then validate mesh network 138. Also, responsive to receiving the message from node 144, controller 140 will validate mesh network 102.

Controllers 104 and 140 will then each direct nodes 108 and 144, respectively, to enter into a bridging mode. In the bridging mode, nodes 108 and 144 will allow communications to securely pass between mesh networks 102 and 138. Node 108 may (i) use the client radio 502a to communicate with node 144, and (ii) use the backhaul radio 504a to communicate with nodes 106, 112, and 110 (and controller 104 via a communication path traversing node 112, for instance). Likewise, node 144 may (i) use the client radio 502b to communicate with node 108, and (ii) use the backhaul radio 504b to communicate with nodes 142, 148, and 146 (and controller 140 via a communication path traversing node 148, for instance).

Furthermore, as both of the controllers direct their respective nodes to enter the respective bridging modes, controllers 104 and 140 will each provide nodes 108 and 144, respectively, with bridging data that enables the nodes to communicate with one another. The bridging data may specify one or more security keys, such as a digital security key, a password, or other secret information that nodes 108 and 144 can exchange with each other. In accordance with an embodiment, controllers 104 and 140 will each provide nodes 108 and 144, respectively, with the same security key(s), as predefined at controllers 104 and 140. Consequently, nodes 108 and 144 can both then engage in secure communications with each other and can thereby securely bridge communications between mesh networks 102 and 138.

Once mesh networks 102 and 138 are bridged in this manner, the "bridge nodes" 108 and 144 will then communicate bearer data and exchange ARP messages and networking data (e.g., TCP/IP communciations) to further facilitate routing of communications between the two mesh networks. For instance, as depicted in FIG. 6, in a scenario 600, client device 128 may pass communications to client device 164 over a communication path that includes nodes 108 and 144. Additionally, if node 142 is in communication with a network 606, then client device 128 may communicate over the network 606 over a communication path that includes nodes 108 and 144.

FIG. 7 is a flow chart 700 provided to illustrate some of the functions that may be carried out in accordance with an embodiment of the present invention. The illustrated functions are explained in the following subsections.

A. The Nodes from each Network Receives the Other's Emitted Signals

As depicted in FIG. 7, at block 702, nodes 108 and 144 each receive the other's emitted WI-FI signals. For instance, a WI-FI signal emitted from node 144 via the backhaul radio 504b may be detected by node 108 via at least one of (i) the client radio 502a and (ii) the backhaul radio 504a. Additionally, a WI-FI signal emitted from node 108 via the backhaul radio 504a may be detected by node 144 via at least one of (i) the client radio 502b and (ii) the backhaul radio 504b. This scenario may occur through movement of the nodes, or if node 108 is off-line, for example, and powered-on in a location that is within the coverage area of node 144. In this scenario, the coverage areas of both the client radio 502a and the backhaul radio 504a of node 108 are within range of the coverage areas of both the client radio 502b and the backhaul radio 504b of node 144.

B. The First-Network Controller Receives a First Message from a First-Network Node At block 704a, controller 104 receives a first message from node 108. Upon node 108 detecting the WI-FI signal emitted by node 144, node 108 may send the first message to controller 104. The first message may comprise the first signal, or may be altogether different from the first signal. Additionally, the first message may include one or more identifiers for node 144 and/or controller 140 (e.g., SSID, MAC address, controller ID, channel on which node 144 is operating, and perhaps other information). Upon receiving the first message, controller 104 may record the one or more identifiers indicated by the first message.

C. The First-Network Controller Validates Second Network

At block 706a, responsive to receiving the first message, controller 104 validates mesh network 138. To validate mesh network 138, controller 104 may validate controller 140, perhaps by determining that its stored peering data includes the one or more identifiers for controller 140 and/or node 144 from the first message, and/or determining that the peering data indicates that the one or more identifiers for controller 140 and/or node 144 correspond to a trusted controller or node.

D. The First Controller Directs the First Node to Enter Bridging Mode

At block 708a, in response to validating mesh network 138, controller 104 directs node 108 to enter a bridging mode. Node 108 may use client radio 502a to communicate with node 144, and may use backhaul radio 504a to communicate with nodes 106, 112, and 110 (and controller 104 via a communication path traversing node 110, for instance).

E. The First-Network Controller Provides the First-Network Node with Bridging Data At block 710a, controller 104 provides node 108 with bridging data, which may comprise various types of data. For instance, the bridging data may comprise an indication of a channel for node 108 to use for communications with node 144. Further, the bridging data may comprise one or more security keys for communications between nodes 108 and 144. A given security key may comprise, for example, a digital security key, password, or even a combination of keys and passwords. Additionally, the security key(s) provided by controller 104 to node 108 will preferably be the same security key(s) provided by controller 140 to node 144.

F. The Second-Network Controller Receives a Second Message from a Second-Network Node At block 704b, at approximately the same time controller 104 receives the first message, controller 140 receives a second message from node 144. Upon node 144 detecting a WI-FI signal emitted by node 108, node 144 may send the second message to controller 140. The second message may comprise the second signal, or may be altogether different from the second signal. Additionally, the second message may include one or more identifiers for node 108 and/or controller 104 (e.g., SSID, MAC address, controller ID, channel on which node 108 is operating, and perhaps other information). Upon receiving the second message, controller 140 may record the one or more identifiers indicated by the second message.

G. The Second-Network Controller Validates the First Network

At block 706b, responsive to receiving the second message, controller 140 validates mesh network 102. To validate mesh network 102, controller 140 may validate controller 104, perhaps by determining that its peering data includes the one or more identifiers for controller 104 and/or node 108 from the second message, and/or determining that its peering data indicates that the one or more identifiers for controller 104 and/or node 108 correspond to a trusted controller or node.

H. The Second-Network Controller Directs the Second-Network Node to Enter Bridging Mode At block 708b, in response to validating mesh network 102, controller 140 directs node 144 to enter a bridging mode. In one embodiment, node 144 uses the client radio 502b to communicate with node 108, and uses the backhaul radio 504b to communicate with nodes 142, 148, and 146 (and controller 140 via communication path traversing node 146, for instance).

I. The Second-Network Controller Provides the Second-Network Node with Bridging Data At block 710b, controller 140 provides node 144 with bridging data, which may comprise various types of data. For instance, the bridging data may comprise an indication of a channel for node 144 to use for communications with node 108. Further, the bridging data may comprise one or more security keys for communications between nodes 144 and 108. A given security key may comprise, for example, a digital security key, password, or even a combination of keys and passwords. Additionally, the security key(s) provided by controller 140 to node 144 will preferably be the same security key(s) provided by controller 104 to node 108.

J. Nodes Associate and Bridge Networks

At block 712, nodes 108 and 144 associate with each other using the security key(s), thereby allowing communications to be securely passed between mesh network 102 and mesh network 138. Additionally, once nodes 108 and 144 associate with each other, the nodes may thereafter communicate bearer data securely with one another, and also may exchange ARP messages, or other routing or network information (e.g., TCP/IP communications), with one another.

As depicted in FIG. 6, once bridged, a wireless communication link 602 may be established between node 108 and 144, such that communications may pass between the two networks. For instance, node 108 may receive communications via the backhaul radio 504a, and may pass the communications to the client radio 502a. The client radio 502a may then send the communications to the client radio 502b of node 144 via the wireless-communication link 602. Node 144 may then pass the communications to the backhaul radio 504b, and may thereafter route the communications to an appropriate destination.

As such, as an example, client device 128 (which may be a mobile station) may communicate with client device 164 (which may also be a mobile station) over a communication path that includes node 108 and node 144. As another example, if node 142 of mesh network 138 is in communication with the network 606, which may be a packet-switched network, then client device 128 may communicate over the network 606 over a communication path that includes node 108 and node 144.

Through operation of the present invention, mesh networks such as mesh networks 102 and 138 may be bridged, such that communications may securely pass between the two networks. At the same time, controllers 104 and 140 may each continue to operate to control mesh networks 102 and 138, respectively. Additionally, although only mesh networks 102 and 138 were described above, the disclosed methods and improvements for joining wireless mesh networks may apply equally to a plurality of mesh networks.

VI. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method of joining a first wireless mesh network ("first network") with a second wireless mesh network ("second network"), wherein the first network includes a first-network controller and a plurality of first-network nodes, and wherein the second network includes a second-network controller and a plurality of second-network nodes, the method comprising:

the first-network controller receiving from a given first-network node a first message, the first message indicating that the given first-network node received a first signal from a given second-network node;

responsive to receiving the first message, the first-network controller (i) validating the second network and (ii) responsive to validating the second network, (a) directing the given first-network node to enter a first bridging mode and (b) providing the given first-network node with first bridging data that includes a security key for communications between the given first-network node and the given second-network node;

the second-network controller receiving from the given second-network node a second message, the second message indicating that the given second-network node received a second signal from the given first-network node;

responsive to receiving the second message, the second-network controller (i) validating the first network and (ii) responsive to validating the first network, (a) directing the given second-network node to enter a second bridging mode and (b) providing the given second-network node with second bridging data that includes the security key; and the given first-network node and the given second-network node associating with each other using the security key, thereby allowing communications to securely pass between the first network and the second network, wherein the first-network controller maintains first peering data, wherein the first message comprises an identifier for the second network, and wherein the first-network controller validating the second network comprises the first-network controller determining that the first peering data includes the identifier for the second network, and wherein the second-network controller maintains second peering data, wherein the second message comprises an identifier for the first network, and wherein the second-network controller validating the first network comprises the second-network controller determining that the second peering data includes the identifier for the first network.

2. The method of claim 1, wherein the first message comprises the first signal, and wherein the second message comprises the second signal.

3. The method of claim 1, wherein the first-network controller validating the second network comprises the first-network controller validating the second-network controller, and wherein the second-network controller validating the first network comprises the second-network controller validating the first-network controller.

4. The method of claim 3, wherein the identifier for the second network comprises an identifier for the second-network controller, and wherein determining that the first peering data includes the identifier for the second network comprises determining that the first peering data includes the identifier for the second-network controller; and wherein the identifier for the first network comprises an identifier for the first-network controller, and wherein determining that the second peering data includes the identifier for the first network comprises determining that the second peering data includes the identifier for the first-network controller.

5. The method of claim 1, wherein the first bridging data comprises an indication of a channel for the given first-network node to use for communications with the given second-network node, and wherein the second bridging data comprises the indication of the channel for the given second-network node to use for communications with the given first-network node.

6. The method of claim 1, further comprising communicating bearer data securely between the given first-network node and the given second-network node using the security key.

7. The method of claim 1, further comprising exchanging address-resolution-protocol ("ARP") messages between the given first-network node and the given second-network node.

8. The method of claim 1, wherein the first network is in communication with a first client device, and wherein the second network is in communication with a second client device, the method further comprising the first client device and the second client device communicating with each other over a communication path that includes the given first-network node and the given second-network node.

9. The method of claim 1, wherein the first network is in communication with a first client device, wherein the second network is in communication with a third network, the method further comprising the first client device communicating over the third network over a communication path that includes the given first-network node and the given second-network node.

10. A method of joining a first wireless mesh network ("first network") with a second wireless mesh network ("second network"), wherein the first network includes a first-network controller and a plurality of first-network nodes, and wherein the second network includes a second-network controller and a plurality of second-network nodes, the method comprising:

the first-network controller receiving from a given first-network node a first message, the first message indicating that the given first-network node received a first signal from a given second-network node;

responsive to receiving the first message, the first-network controller (i) validating the second network and (ii) responsive to validating the second network, (a) directing the given first-network node to enter a first bridging mode and (b) providing the given first-network node with first bridging data that includes a security key for communications between the given first-network node and the given second-network node;

the second-network controller receiving from the given second-network node a second message, the second message indicating that the given second-network node received a second signal from the given first-network node;

responsive to receiving the second message, the second-network controller (i) validating the first network and (ii) responsive to validating the first network, (a) directing the given second-network node to enter a second bridging mode and (b) providing the given second-network node with second bridging data that includes the security key; and the given first-network node and the given second-network node associating with each other using the security key, thereby allowing communications to securely pass between the first network and the second network, wherein the given first-network node comprises a first client radio and a first backhaul radio, and wherein upon being directed by the first-network controller to enter the first bridging mode, the given first-network node responsively uses the first client radio to communicate with the given second-network node and uses the first backhaul radio to communicate with at least one of (i) at least one other first-network node and (ii) the first-network controller, and wherein the given second-network node comprises a second client radio and a second backhaul radio, and wherein upon being directed by the second-network controller to enter the second bridging mode, the given second-network node responsively uses the second client radio to communicate with the given first-network node and uses the second backhaul radio to communicate with at least one of (i) at least one other second-network node and (ii) the second-network controller.

11. In a system comprising a first wireless mesh network ("first network") and a second wireless mesh network ("second network"), wherein the first network includes a first-network controller and a plurality of first-network nodes, and wherein the second network includes a second-network controller and a plurality of second-network nodes, the improvement comprising:

first logic in the first-network controller, the first logic being executable to: (i) in response to the first-network controller receiving from a given first-network node a first message, wherein the first message indicates that the given first-network node received a first signal from a given second-network node, validate the second network and (ii) in response to validating the second network, (a) direct the given first-network node to enter a first bridging mode and (b) provide the given first-network node with first bridging data that includes a security key for communications between the given first-network node and the given second-network node; and second logic in the second-network controller, the second logic being executable to: (i) in response to the second-network controller receiving from the given second-network node a second message, wherein the second message indicates that the given second-network node received a second signal from the given first-network node, validate the first network and (ii) in response to validating the first network, (a) direct the given second-network node to enter a second bridging mode and (b) provide the given second-network node with second bridging data that includes the security key, wherein the first-network controller comprises first data storage, wherein the first data storage contains first peering data, wherein the first message comprises an identifier for the second network, and wherein the first logic is executable to validate the second network at least in part by determining that the first peering data includes the identifier for the second network, and wherein the second-network controller comprises second data storage, wherein the second data storage contains second peering data, wherein the second message comprises an identifier for the first network, and wherein the second logic is executable to validate the first network at least in part by determining that the second peering data includes the identifier for the first network.

12. The improvement of claim 11, wherein:
the first-network controller comprises a first communication interface, wherein the first communication interface is operable to receive from the given first-network node the first message; and
the second-network controller comprises a second communication interface, wherein the second communication interface is operable to receive from the given second-network node the second message.

13. The improvement of claim 11, wherein:
the first-network controller comprises a first processor, and wherein the first logic comprises machine-language instructions stored in the first data storage and executable by the first processor; and
the second-network controller comprises a second processor, and wherein the second logic comprises machine-language instructions stored in the second data storage and executable by the second processor.

14. The improvement of claim 13,
wherein the identifier for the second network comprises an identifier for the second-network controller; and
wherein the identifier for the first network comprises an identifier for the first-network controller.

15. The improvement of claim 13, wherein the first bridging data comprises an indication of a channel for the given first-network node to use for communications with the given second-network node, and wherein the second bridging data comprises the indication of the channel for the given second-network node to use for communications with the given first-network node.

16. The improvement of claim 11, wherein bearer data is communicated securely between the given first-network node and the given second-network node using the security key.

17. The improvement of claim 11, wherein address-resolution-protocol ("ARP") messages are communicated between the given first-network node and the given second-network node.

18. The improvement of claim 11, wherein the first network is in communication with a first client device, wherein the second network is in communication with a second client device, and wherein the first client device and the second client device communicate with each other over a communication path that includes the given first-network node and the given second-network node.

19. The improvement of claim 11, wherein the first network is in communication with a first client device, wherein the second network is in communication with a third network, and wherein the first client device communicates over the third network over a communication path that includes the given first-network node and the given second-network node.

20. In a system comprising a first wireless mesh network ("first network") and a second wireless mesh network ("second network"), wherein the first network includes a first-network controller and a plurality of first-network nodes, and wherein the second network includes a second-network controller and a plurality of second-network nodes, the improvement comprising:

first logic in the first-network controller, the first logic being executable to: (i) in response to the first-network controller receiving from a given first-network node a first message, wherein the first message indicates that the given first-network node received a first signal from a given second-network node, validate the second network and (ii) in response to validating the second network, (a) direct the given first-network node to enter a first bridging mode and (b) provide the given first-network node with first bridging data that includes a security key for communications between the given first-network node and the given second-network node; and second logic in the second-network controller, the second logic being executable to: (i) in response to the second-network controller receiving from the given second-network node a second message, wherein the second message indicates that the given second-network node received a second signal from the given first-network node, validate the first network and (ii) in response to validating the first network, (a) direct the given second-network node to enter a second bridging mode and (b) provide the given second-network node with second bridging data that includes the security key, wherein the given first-network node comprises a first client radio and a first backhaul radio, and wherein upon being directed by the first-network controller to enter the first bridging mode, the given first-network node responsively uses the first client radio to communicate with the given second-network node, and uses the first backhaul radio to communicate with at least one of (i) at least one other first-network node and (ii) the first-network controller, and wherein the given second-network node comprises a second client radio and a second backhaul radio, and wherein upon being directed by the second-network controller to enter the second bridging mode, the given second first-network node responsively uses the second client radio to communicate with the given first-network node, and uses the second backhaul radio to communicate with at least one of (i) at least one other second-network node and (ii) the second-network controller.

\* \* \* \* \*